(12) United States Patent
Williams

(10) Patent No.: US 6,708,640 B1
(45) Date of Patent: Mar. 23, 2004

(54) TOW CABLE TERMINATION ASSEMBLY

(75) Inventor: Michael R. Williams, West Kingston, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/244,923

(22) Filed: Sep. 12, 2002

(51) Int. Cl.$^7$ .............................. B63B 21/58; G01V 1/38
(52) U.S. Cl. ......................................... 114/249; 367/20
(58) Field of Search ........................... 114/242, 243, 114/244, 249, 253; 367/15, 20

(56) References Cited

U.S. PATENT DOCUMENTS

| | | | |
|---|---|---|---|
| 4,189,620 A | * 2/1980 | Stange | 174/79 |
| 4,673,231 A | * 6/1987 | McAnulty, Sr. | 439/587 |
| 5,183,966 A | * 2/1993 | Hurtado et al. | 174/20 |
| 5,673,644 A | * 10/1997 | Vanasse et al. | 114/242 |
| 5,983,821 A | * 11/1999 | Williams | 114/244 |
| 6,292,431 B1 | * 9/2001 | Talamo | 367/20 |

* cited by examiner

Primary Examiner—S. Joseph Morano
Assistant Examiner—Andrew Wright
(74) Attorney, Agent, or Firm—James M. Kasischke; Jean-Paul A. Nasser; Michael F. Oglo

(57) ABSTRACT

A distributed fiber strength member tow cable termination assembly (DTCTA) having a strength member termination area which is spaced from a signal conductor termination area, and which includes a seal area having a plurality of sealing members is disclosed. The strength member termination area preferably includes a strength member termination wedge having a curved outer face which allows for higher termination efficiency. The strength member termination area and signal conductor termination area are distributed, or separated, a predetermined distance by an interface section, for example a length of hose. The separation of the strength member termination area from the signal conductor termination area allows for several improvements in the DTCTA not possible in the prior art due to the previous need to terminate the signal conductors co-located with the strength termination member.

13 Claims, 4 Drawing Sheets

TOW CABLE TERMINATION ASSEMBLY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates to a tow cable termination assembly providing the termination and interface between an electro-optical tow cable and a towed array, or other towed optical system, and more particularly to a distributed tow cable termination assembly.

(2) Description of the Prior Art

Use of a towing cable to tow an array is a well known and acceptable element of a sonar system. The cable typically includes a core of optical fibers and/or electrical conductors housed within a protective jacket. One end of the cable supports the towed system (or array), the opposite end being the strength member termination area. Due to its operating environment, mechanical difficulties have been encountered with prior art towing cables. For example, synthetic fibers having high strength-to-weight ratios have been used for conventional tow cable termination assemblies (for example, Kevlar® fiber available from DuPont, Vectran® fiber available from Hoechst-Celenese, and Spectra® fiber available from Allied Signal), but the use of such fibers has not always met with success. In particular, the design parameters for a conventional tow cable requires that the synthetic fiber be used as the strength member, and special lightweight materials be used throughout. Conventional termination designs provide termination efficiencies (defined as the ratio of termination break strength to cable strength) of about 30% to 50% when utilizing these synthetic fibers. However, the requirements for the next generation tow cable termination assembly is in excess of 70%.

In addition, a second requirement for the termination assembly is to provide a seal against seawater intrusion into the core of the cable which can result in failure. Due to the higher incident of elongation, or stretch, of the fiber strength member in the tow cable (in comparison to a steel cable), failures have occurred in the seal area due to incidents of seawater intrusion. The seawater intrusion primarily results from the ineffectiveness of current seal designs to prevent leakage when the fibers become elongated and the core moves independently of the strength member. Conventional designs utilize a single o-ring as a secondary seal and do not protect against seawater intrusion through epoxy injections tubes if the primary seals fail.

Another issue associated with conventional termination assemblies is that they degrade over time in terms of strength and seal capability, because of the nature of the synthetic fibers, and the need to reel the cable around a winch during use. For example, the forces applied to the termination assemblies during use can result in a strength loss in the termination. This has been found to be especially true with towed array thin line handling systems that use 36" diameter, multiple groove sheaves for handling the cable. Additionally, there have been problems associated with breakage of fibers and wires in the transition area between the tow cable termination assembly and the towed system. The use of synthetic fiber increases this problem and has been found to be a very difficult design issue. The changes in the stiffness between the cable and the towed system or device can also cause significant damage to the termination and the cable. The termination assembly is required to meet all strength and environmental specifications for their operating life which is expected to be typically about 3–5 years and includes numerous handling and deployment evolutions. Conventional designs do not support these requirements.

Accordingly, there is needed in the art a tow cable termination assembly having an improved operating life and which is cost effective, reliable and easy to manufacture.

SUMMARY OF THE INVENTION

The present invention is directed to a distributed fiber strength member tow cable termination assembly (DTCTA) having a strength member termination area which is spaced from a signal conductor termination area, and further includes a seal area having a plurality of sealing members. The strength member termination area preferably includes a strength member termination wedge having a curved outer face which allows for higher termination efficiency. The strength member termination area and signal conductor termination area are distributed, or separated, by a predetermined distance by, for example a length of hose. In one embodiment, epoxy is fed through holes located inside the primary seal area into the termination wedge. A secondary seal area including a plurality of stacked seals, for example V-cup seals, are also disposed behind the primary seal. The DTCTA further supports all hydrodynamic tow loads applied by the towed system and transfers the data and power over the electro-optical core, as is known in the art.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DESCRIPTION OF THE PREFERRED EMBODIMENTS

Figure 1:
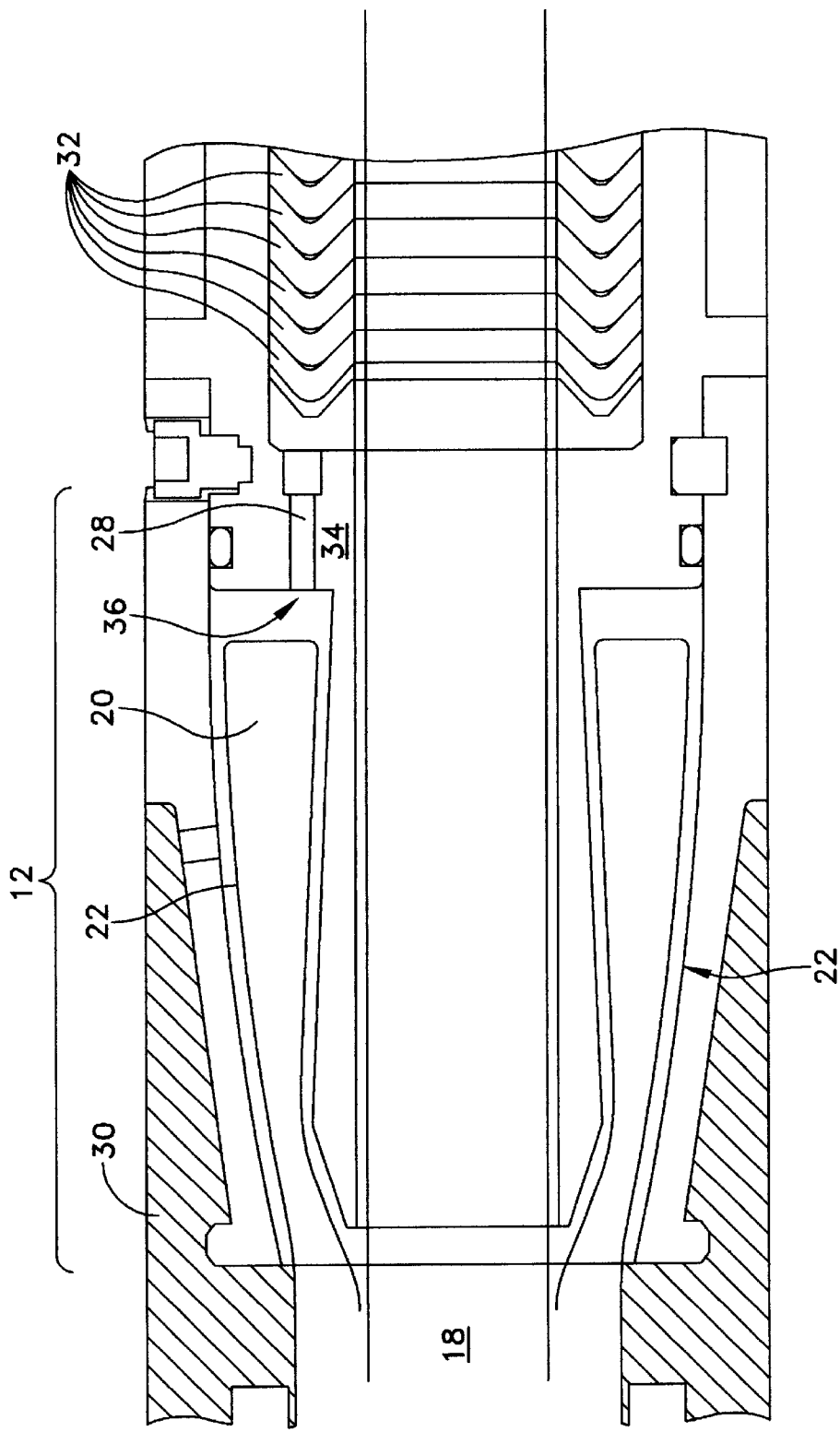
FIG. 1 is a cross section view of a first end of a strength member termination area, showing a termination wedge and secondary redundant seals.

Referring now to the FIGS., the distributed fiber strength member tow cable termination assembly (DTCTA) 10 includes a strength member termination area 12, a seal area 14, and a signal conductor termination area 16. The strength member termination area 12 supports the towed cable 18 and includes a strength member termination wedge 20 to minimize the stresses on the DTCTA during use, as known in the art. The signal conductor termination area 16, located opposite the strength member termination area, supports the towed array 22. The seal area 14 supports a primary seal 30 and a plurality of secondary seals 32. In the distributed design of the present embodiment, the strength member termination area 12 is spaced a predetermined distance "d" from the signal conductor termination area 16, such that the signal conductors are not co-located within the strength member termination area. The separation of the strength member termination area 12 from the signal conductor termination area 16 allows for several improvements in the DTCTA not possible in the prior art due to the previous need to terminate the signal conductors co-located with the strength termination member. These improvements include, but are not limited to, a change in geometry in the termination wedge 20 improving termination efficiency; relocation of epoxy injection tubes 28 to a more beneficial sealing location; provision of the plurality of secondary redundant seals 32 to improve sealing; a decrease in length of the strength member and signal conductor termination members resulting in a reduction in applied forces; improved bending stiffness; improved handling and termination of the electro-optical core; and easier manufacture and assembly, as described in greater detail below.

A first improvement of DTCTA 10 is a change in geometry of the strength member termination wedge 20. The outer surface 22 of the wedge preferable has a slight curvature "c", which allows the outer surface 22 to better distribute forces over the entire area of the wedge 20, in the present embodiment. This, in turn, results in a higher termination efficiency, where the termination efficiency=termination break strength/cable break strength. The curvature "c" gives the wedge of the present invention a different geometry over previous prior art wedges which included a straight edge outer surface. The separation of the strength member termination area from the signal conductor termination area allows the wedge shape to be changed to include the curved outer surface because of the increased volume in the strength member termination area due to the separation of the signal conductor termination area. In addition to better distributing forces, the wedge shape of the present invention also allows more epoxy into the interior of the wedge because the wedge member has an increased volume due to its curved shape. By providing more epoxy in the wedge, the ratio of high strength fiber to epoxy is decreased, thus also improving the termination efficiency of the DTCTA by better surrounding and encapsulating substantially all of the fibers.

One or more epoxy injection tubes 28 are preferably placed within an interior portion 34 of the strength member termination area such that the tube is interior of both the primary seals 30 and the secondary seals 32. Thus, the injection tubes are inside of the primary water barrier. By placing the tubes 28 in this location within the interior portion, and not on the outside surface of the termination, damage to the primary seal is isolated and the termination member is protected from seawater leaking into the epoxy injections tubes 28 and into wedge 20 which could lead to strength degradation and reduced operating life. In addition, the epoxy injection tubes are preferably located such that a first end of the tube is operatively connected to the base 36, or thickest portion, of the wedge in the present embodiment. In this location, air bubbles are readily removed from the wedge as the epoxy enters, which allows for improved strength and more consistent termination as the epoxy fills the wedge.

Figure 2:
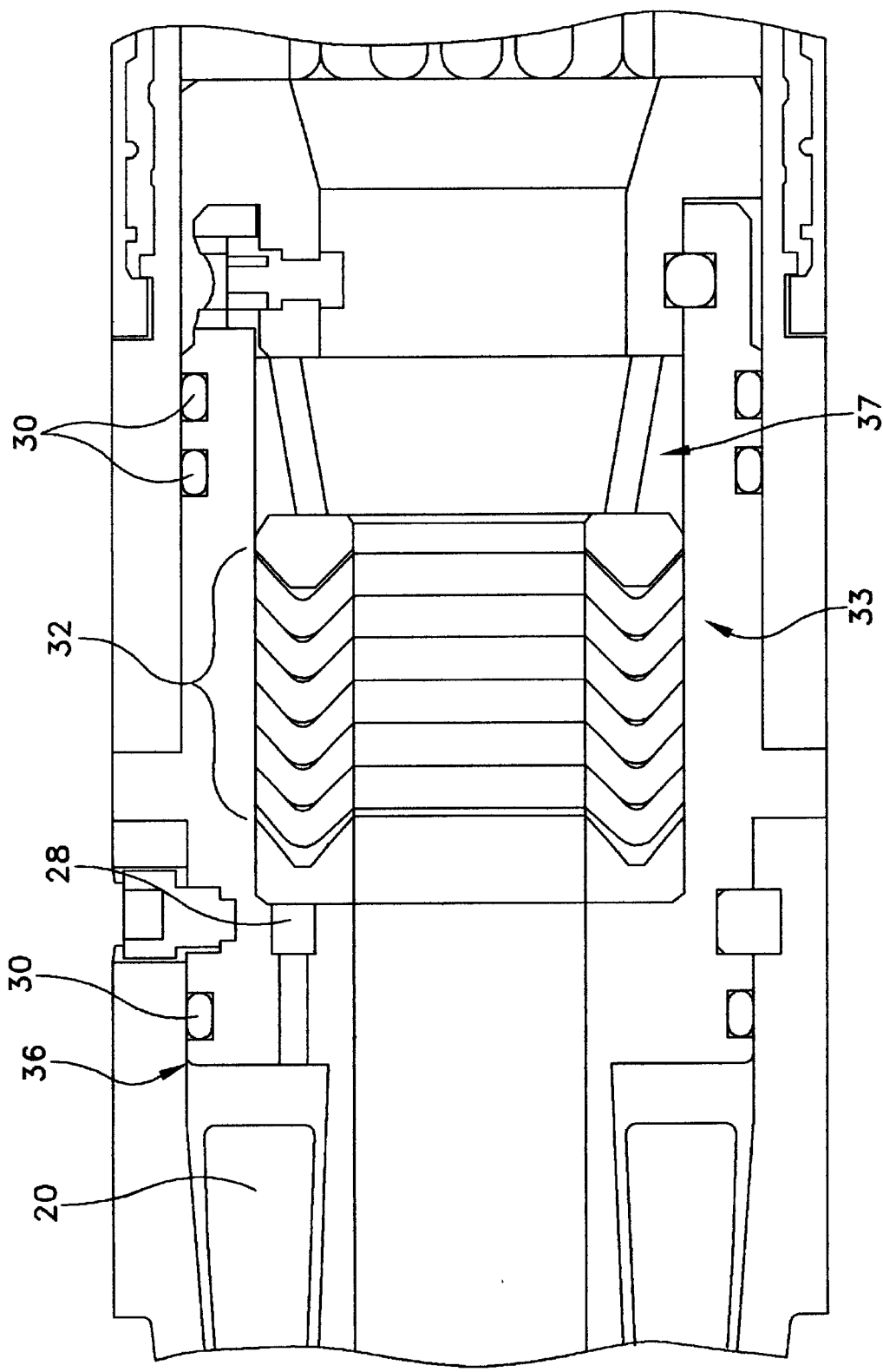
FIG. 2 is a cross section view of a middle section of the strength member termination area, showing the primary and secondary seals.
Figure 3:
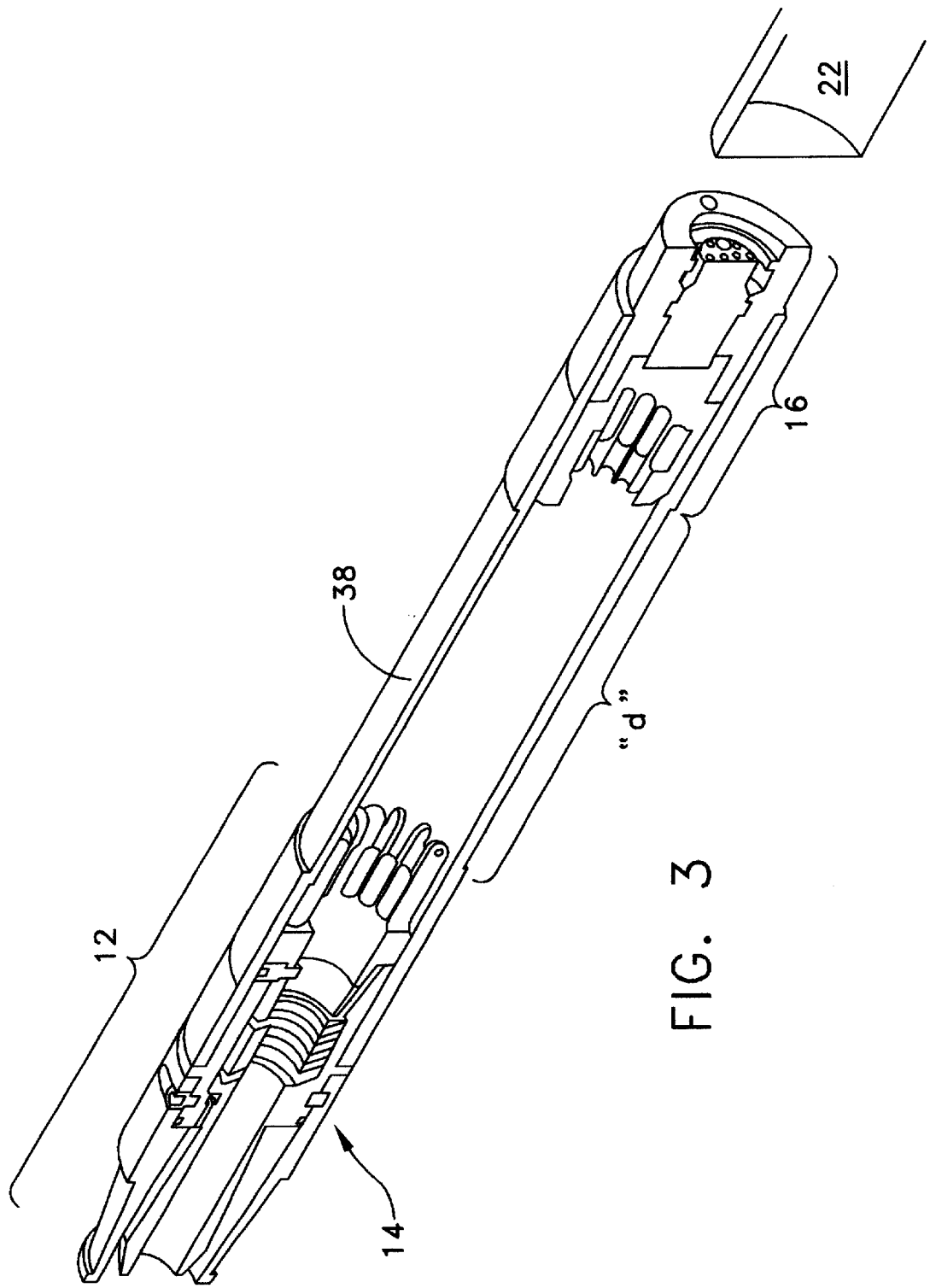
FIG. 3 is a perspective cross-section view of the tow cable termination assembly of the present invention.
Figure 4:
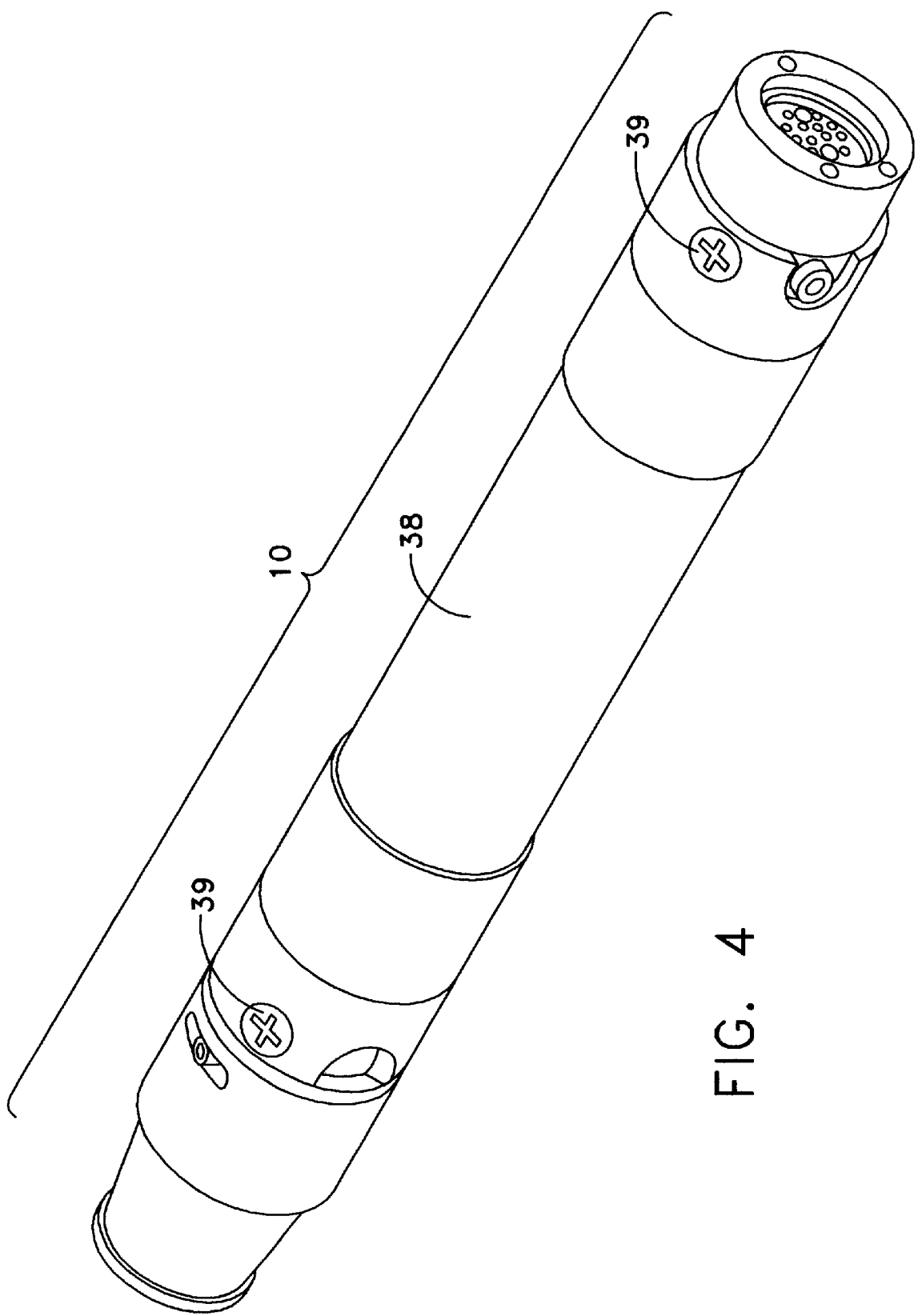
FIG. 4 is a perspective view of the tow cable termination assembly of FIG. 3.

Referring now to FIG. 2, the present embodiment further includes a secondary sealing assembly 33, having a plurality of secondary redundant seals 32 to improve sealing of the electro-optical cable core. In the present embodiment, the seals 32 are "V-cup" type seals which are designed to be utilized with nonmetallic materials, such as cable jackets, as is known in the art. The "V-cup" design allows for devices which are slightly non-circular in shape to be reliably sealed. Thus, reliable sealing is provided during movement of the cable core 15 relative to the strength member area without reduction in the seal integrity and without seal degradation or damage to the core. In addition, the seals 32 are preferably stacked, such that a plurality of redundant seals may be provided. In the present embodiment six seals are provided, although any number of seals 32 may be provided, as would be known in the art. It will be appreciated that should a single seal fail, five backup seals would remain in place. An adaptor and spring 37 which supports the seals 32 are also provided as part of the sealing assembly 33.

By separating the strength member termination area 12 from the signal conductor termination area 16, the length of each area is shortened as compared to the length of the combined strength member/signal conductor terminations of the prior art. In the present embodiment, the length of each area is reduced by about 20%. When cables are handled (for example, by pulling through and letting out) a sheave or capstan device is utilized (not shown), as known in the art. These devices apply forces to the termination that is directly proportional to the termination length. Thus, by reducing the length of each member by about 20%, a corresponding 20% reduction in the applied forces occurs. The reduction in applied forces dramatically reduces the strength loss otherwise suffered by the tow cable termination assembly 10 over time due to repeated application of the applied forces during use. In addition, the separation or distributed design reduces the bending stiffness (or impedance) discontinuity between the cable and towed system which was present in the prior art. By adding an additional interface section 38 between the cable and the towed system, the change in stiffness between the two is more gradual, thus minimizing the bend points, and significantly reducing the bending stiffness discontinuity and degradation which can result. In the present embodiment, the section 38 may preferably be in the form of a hose which acts as an interface to allow the bending stiffness to change more gradually in two increments, rather than one. The hose may be made of any suitable underwater material, for example polyurethane and may be connected to the terminations by fasteners 39, for example radial screws. Alternately, the section 38 may be made from any suitable material. The electro-optical cable core is passed through the strength member termination area and is terminated in the hose interface section 38. In the present embodiment, this allows for up to about 20 feet of transition area for the core termination. With the additional space provided by the hose assembly section, the bending and other forces applied to the core and core termination are dramatically reduced over the prior art designs. The length of the interface section defines the predetermined distance that the strength member termination area is spaced from the signal conductor termination area.

In addition to the foregoing, by distributing or spacing the strength member termination area 12 from the signal conductor termination area 16, assembly of the tow cable termination assembly is improved. In particular, the various components of the assembly can be manifested and assembled independently which reduces the complexity and cost for assembly of the cable termination assembly.

It will be understood that many additional changes in the details, materials, steps and arrangements of parts, which have been herein described and illustrated in order to explain the nature of the invention, may be made by those skilled in the art within the principle and scope of the invention as expressed in the appended claims.

What is claimed is:

1. A strength member tow cable termination assembly having an electro-optical cable core including a plurality of optical fibers and/or electrical conductors housed within a protective cable jacket, the termination assembly comprising:
   a strength member termination area disposed at a first end of the termination assembly and constructed and arranged to support a towed cable;
   a signal conductor termination area disposed at a second end of the termination assembly, spaced from and y opposite the strength member termination area, the signal conductor termination area constructed and arranged to support a towed array;
   a seal area disposed adjacent the strength member termination area and constructed and arranged to support at least one seal;
   an interface section disposed between the strength member termination area and the signal conductor termination area, the interface section constructed and arranged to operatively connect the strength member and signal conductor termination areas comprising a hose having a first end supported by the strength member termination area and a second end supported by the signal conductor termination area; and
   wherein the strength member termination area is spaced a predetermined distance from the signal conductor termination area by a length of the interface section.

2. The termination assembly of claim 1 wherein the strength member termination area includes a strength member termination wedge having a curved outer surface.

3. The termination assembly of claim 2 further comprising one or more epoxy injection tubes having a first end operatively connected to a base of the termination wedge.

4. The termination assembly of claim 3 wherein the one or more injection tubes are disposed interior of an at least one primary seal and a secondary sealing assembly.

5. The termination assembly of claim 1 wherein the at least one seal comprises at least one primary seal and a secondary sealing assembly.

6. The termination assembly of claim 5 wherein the secondary sealing assembly includes a plurality of redundant seals.

7. The termination assembly of claim 6 wherein the plurality of redundant seals have a generally V-cup shape and are constructed and arranged to be stacked adjacent the strength member termination area.

8. The termination assembly of claim 1 wherein the electro-optical cable core is passed through the strength member termination area and is terminated in the interface section that comprises a hose.

9. A strength member tow cable termination assembly having an electro-optical cable core including a plurality of optical fibers and/or electrical conductors housed within a protective cable jacket, the termination assembly comprising:
   a strength member termination area disposed at a first end of the termination assembly and constructed and arranged to support a towed cable, and further including a strength member termination wedge having a curved outer surface;
   one or more epoxy injection tubes having a first end operatively connected to a base of the termination wedge;
   a signal conductor termination area disposed at a second end of the termination assembly, spaced from and opposite the strength member termination area, the signal conductor termination area constructed and arranged to support a towed array;
   a seal area disposed adjacent the strength member termination area, the seal area including at least one primary seal and a secondary sealing assembly;
   an interface section disposed between the strength member termination area and the signal conductor termination area, the interface section constructed and arranged to operatively connect the strength member and signal conductor termination areas; and
   wherein the strength member termination area is spaced a predetermined distance from the signal conductor termination area by a length of the interface section and wherein the electro-optical cable core is passed through the strength member termination area and is terminated in the interface section that is in the form of a hose.

10. The termination assembly of claim 9 wherein the one or more injection tubes are disposed interior of both the at least one primary seal and the secondary sealing assembly.

11. The termination assembly of claim 9 wherein the secondary sealing assembly includes a plurality of redundant seals.

12. The termination assembly of claim 11 wherein the plurality of redundant seals have a generally V-cup shape and are constructed and arranged to be stacked adjacent the strength member termination area.

13. The termination assembly of claim 9, wherein the interface section comprises a hose having a first end supported by the strength member termination area and a second end supported by the signal conductor termination area.

* * * * *